Dec. 8, 1953  L. W. LUBENOW  2,661,496
METHOD OF AND APPARATUS FOR SUPPLYING STEAM
TO THE INTERIOR OF ADVANCING MOLDS
Filed July 26, 1952  3 Sheets-Sheet 2
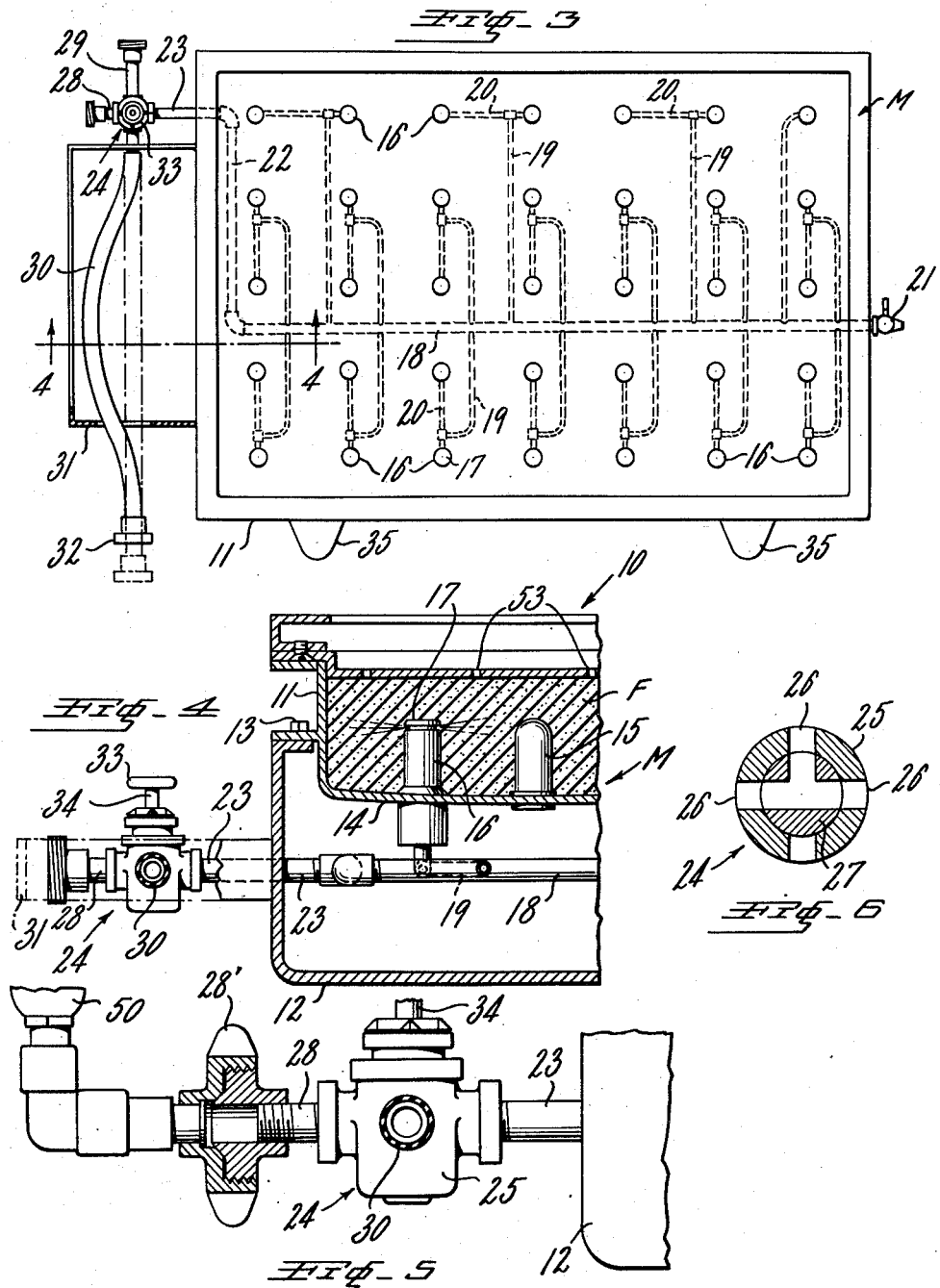
INVENTOR.
LEWIS W. LUBENOW
BY
Charles C. Willson
ATTORNEY

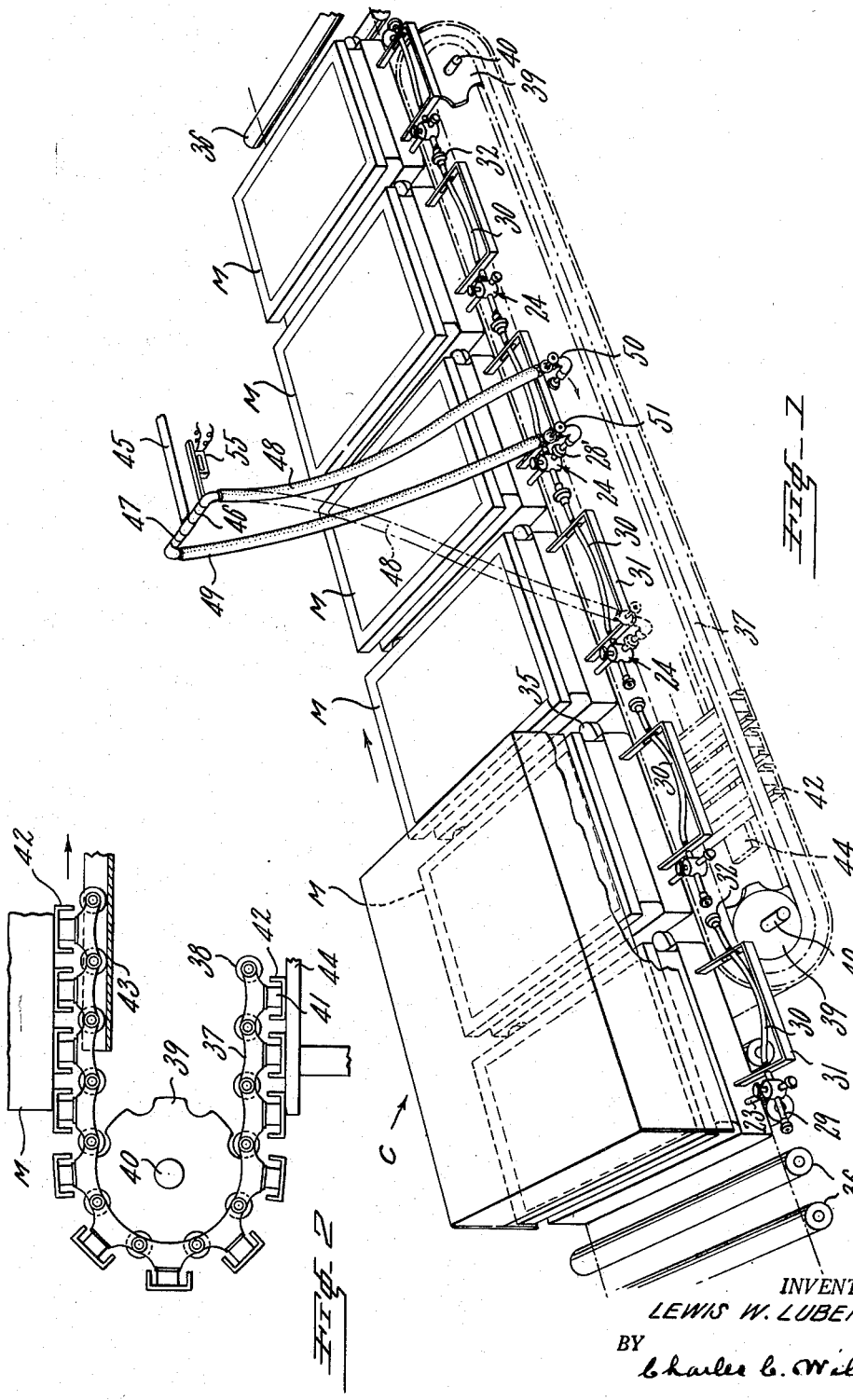

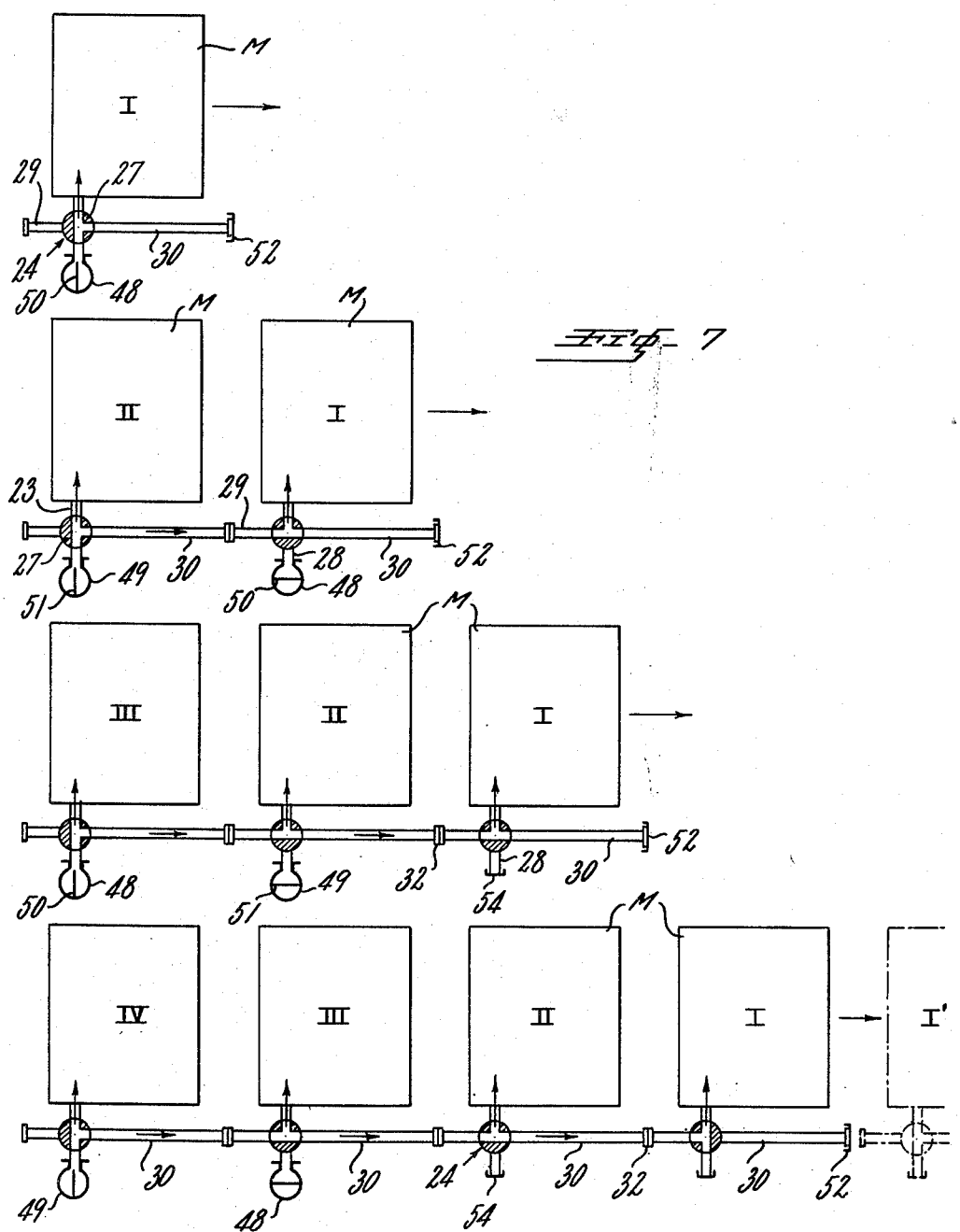

Patented Dec. 8, 1953

2,661,496

UNITED STATES PATENT OFFICE 2,661,496

METHOD OF AND APPARATUS FOR SUPPLYING STEAM TO THE INTERIOR OF ADVANCING MOLDS

Lewis W. Lubenow, Nutley, N. J., assignor to United States Rubber Company, New York, N. Y., a corporation of New Jersey Application July 26, 1952, Serial No. 301,034

13 Claims. (Cl. 18—6)

1

The present invention relates to a method of and apparatus for supplying steam to the interior of advancing molds, such as molds containing latex foam, to pass quickly through the foam and cure the same. The steam supply equipment and method of operating the same can, however, be employed to cure or heat other materials than latex in molds.

It has been proposed heretofore in the manufacture of latex foam mattresses and large cushions having core holes therein to quickly cure the latex foam in a mold, by introducing steam into the mold at various points so that the steam will pass through the porous gelled foam and quickly cure the same. One proposed means for accomplishing this is to utilize some of the cores, provided to form core holes in the molded latex foam, to supply steam to the interior of the mold at various points to escape from these cores into the latex foam and cure the foam, as described and claimed in the Lovell Patent No. 2,595,964.

The present invention contemplates further improvements in the art of producing large molded latex foam articles, whereby the curing steam can be supplied to the interior of a number of molds containing latex foam as these molds are slowly advanced along a predetermined path. This is accomplished in accordance with the preferred embodiment of the present invention by providing a straight line conveyor, adapted to advance a series of molds from adjacent the position where the molds are filled with latex foam towards the position where the finished vulcanized foam articles are removed from the molds. While the molds are advanced in a row by such conveyor, steam is supplied to several of such molds preferably by providing a steam supply pipe at a fixed position above the conveyor and having two flexible lengths of hose extending downwardly therefrom so that either hose can be attached to an advancing mold to supply steam to this mold and also to adjacent molds. Each hose is long enough to travel with an advancing mold a short distance, when its lower end is attached to the steam connection of such mold. The arrangement is such that as a mold to which either steam supply hose is attached, advances to a forward position, the lower end of the hose connected to such mold can be disengaged therefrom and moved rearwardly to be attached to a rear advancing mold.

Steam could be supplied to the molds by a single downwardly extending hose but it is desirable that steam be supplied continuously to a number of the advancing molds, and that this

2 supply of steam shall not be cut off while a steam supply hose is being disconnected from a mold at an advanced position and is moved rearwardly and connected to a mold in a rearward position. In order to insure a continuous supply of steam to such molds, two similar lengths of hose are provided to extend downwardly from a steam supply pipe, so that one hose will operate to supply steam to a group of advancing molds while the other hose is being shifted from an advance mold to a rear mold and connected to the latter.

The present invention contemplates that steam will be supplied simultaneously to several of the advancing molds, rather than to a single mold, to speed up the curing operation. To accomplish this it is necessary to provide steam connections between such molds, and to disconnect such connection as each mold leaves the steam supply area and to connect up each mold that enters this area.

By supplying dry steam at elevated temperatures to a group of advancing molds in accordance with the present invention, it is possible to cure the latex foam of bed mattresses or other large thick foam article in a period of say twenty minutes, whereas to cure the same size foam article in a vulcanizer would take an hour or more, and by shifting the pipe connections from a forward to a rearward position as the molds advance, it is possible to supply steam continuously to the latex foam in the advancing molds.

To facilitate this continuous operation the molds are filled with latex foam at one position called the pouring station, and are then moved to the receiving end of the conveyor to be advanced by this conveyor first through the gelling area and then through the steam curing area. As the latex foam is gelled the foam cells break down to form a porous cellular mass through which curing steam can readily pass. By the time each mold is advanced to the end of the curing area the latex foam should be cured or vulcanized. Such mold is then moved to a stripping station, where the cover of the mold is removed and the molded latex foam articles is pulled out of the mold. The empty mold is then cooled by advancing it in the opposite direction through a cooling chamber where the mold is cooled by forcing atmospheric air or chilled air through such chamber. The cooled mold after it has been cleaned to free it from any particles of latex foam that may remain therein, and has been sprayed with a soap solution or otherwise treated with a lubricant, is now ready to be filled again with latex foam, to repeat the cycle just described for producing molded latex foam mattresses or cushions.

The present invention is particularly well adapted for use in curing large molded foam articles, because it makes possible the use of a rapid flow of steam at elevated temperatures through a large cellular mass to cure the same quickly.

The above and other features of the method and apparatus of the present invention will be further understood from the following description when read in connection with the accompanying drawings wherein:

Fig. 1 is a perspective view of apparatus embodying the present invention and adapted to supply steam to several advancing molds containing latex foam.

Fig. 2 is a side view with parts in section of the mold advancing conveyor.

Fig. 3 is a top plan view of a mold with the cover removed and with the steam supply pipes shown in dotted lines.

Fig. 4 on a larger scale is a sectional view taken on the line 4—4 of Fig. 3.

Fig. 5 is a side view with parts in section of steam pipe connections.

Fig. 6 is a horizontal sectional view through a three-way valve; and

Fig. 7 is a diagrammatic plan view showing the position of the valves and pipe connections as the molds are advanced by a conveyor.

In molding large mattresses or other large latex foam articles having core holes therein, the mold may be provided with a hundred or more cores projecting into the mold from an upper wall or lower wall or from both. These cores form core holes in the foam to reduce the weight of the molded article and the amount of latex used to produce such article. In curing molded latex foam by forcing steam rapidly through the cellular foam structure the steam is preferably introduced into the foam through a number of the cores disposed at well selected points, so that the steam supplied to the interior of the mold by such cores will cure the foam uniformly. The construction of the cores for supplying steam into the interior of the mold may be varied extensively and one such construction is disclosed in the Lovell patent above cited. A somewhat different construction is shown in Fig. 4 of the drawing and will be hereinafter described.

The size and shape of the mold used will, of course, depend upon the size and shape of the desired finished latex foam article. The mold shown in the drawings is of the type used to produce latex foam mattresses such as a double bed mattress. This mold as shown in the drawings is designated in its entirety by the letter M. Such mold is shown in Fig. 4 as having the removable upper section or cover 10 and a lower section or pan 11 into which the latex foam is poured. Below this pan 11 is provided a pipe receiving chamber formed by the receptacle or cradle 12 which is bolted to the pan as indicated at 13. This cradle has a flat bottom adapted to support the mold as it is advanced by the conveyor, to be described, and also to support the mold while it is being moved to and from such conveyor. The bottom 14 of the pan 11 is curved slightly adjacent its vertical side walls, as will be apparent from Fig. 4, to impart to the finished latex mattress a slight slope adjacent its four edges. The mold of Figs. 3 and 4 as actually constructed has over a hundred cores extending upwardly from its lower wall 14. Most of these cores are hollow aluminum cores such as indicated by 15 in Fig. 4 and are not shown in Fig. 3. Their sole purpose is to form core holes in the molded latex foam F. A substantial number of cores disposed at spaced points throughout the mold, and which are designated by 16 in Figs. 3 and 4, are steam supply cores adapted to discharge steam into the latex foam as indicated in Fig. 4. These steam supply cores 16 may be variously constructed, and as shown comprise a hollow body portion having seated upon its upper end the valve or cap 17 which is yieldingly held in the seated position by a coiled spring, not shown. The arrangement is such that this valve is normally closed so that latex cannot enter beneath the cap 17, but when steam is forced into the hollow core it will lift the cap sufficiently to let steam escape therefrom below the cap as indicated in Fig. 4.

The mold is shown in Fig. 3 as provided with thirty-five of these steam supply cores 16 disposed as shown, and steam is supplied to these cores by the pipe connections located in the cradle 12 below the pan 11. Steam is supplied to the cores 16 by a longitudinally extending steam pipe 18 having the various branched pipes 19 and 20 leading to the cores 16. The supply pipe 18 preferably slopes downwardly slightly towards one end, and this end is provided with the drain cock 21 through which water formed by the condensed steam may be removed. The pipe 18 is connected by a horizontally extending pipe 22 to a pipe 23 that projects from one end of the mold. This pipe 23 is provided outside of the mold with the four-way, three-part valve 24, the construction of which is well shown in Fig. 6. This valve 24 which is of well-known construction has the valve casing 25 provided with the four outlet openings 26 disposed at right angles to each other, and within this casing is rotatively mounted the plug 27 having the three-way passages shown. By referring to Fig. 3 it will be seen that the valve 24 has one opening 26 connected to the pipe 23 and the diametrically opposite opening connected to a threaded nipple 28. To a third opening 26 is connected the threaded nipple 29, and to the remaining opening 26 is connected the flexible pipe or hose 30 shown as supported in a horizontal position by the metal guard 31 that is rigidly secured to one end of the mold 11. To the outer end of this flexible hose is secured the manually operable coupling 32 adapted to engage the threaded nipple 29 of an adjacent mold. The valve plug 27 is manually rotated by the valve hand wheel 33 secured to the valve stem 34. As the molds are moved from one position to another they may bump each other and the mold 11 is therefore shown as having the bumper projections 35.

Having described the construction of one mold for producing molded latex articles, and the pipe connections for supplying steam to the hollow cores 16 that deliver steam into the latex foam at various points in the mold, the mechanism contemplated by the present invention for supplying dry steam at elevated temperature simultaneously to several advancing molds will now be described.

As shown in Fig. 1, a number of molds M are advanced in the direction indicated by the arrow by an endless conveyor or apron having the construction best shown in Fig. 2. The upper surface of this conveyor is preferably positioned about 30 inches from the floor of the building to support the molds M at a convenient distance from the floor. As these molds approach and leave the upper run of such endless conveyor they are conveniently supported at the level of such run by rolls or rollers 36.

The endless conveyor for the mold is preferably formed of three endless chains or link belts formed of the connected links 37 having the anti-friction rollers 38. Only one of these chains is shown in the drawing but a chain at each side of the endless conveyor is needed and one halfway between the side chains is desirable. Each endless chain engages at each end of its run a sprocket wheel 39 rigidly secured to a supporting shaft 40, and one of these shafts is power driven to drive the chains. Each link 37 preferably has extending therefrom a block 41 to which is rigidly secured a transversely extending channel bar 42, so that the upper face of these channel bars will form the support for the series of the molds M that are advanced by this endless apron. The molds M are relatively heavy and the upper run of the chains are preferably supported by longitudinally extending channels 43 that are engaged by the rollers 38 as shown in Fig. 2. The lower run of this endless conveyor is preferably supported by allowing the cross bars 42 to rest upon and slide along hardwood strips 44 supported by the machine frame.

In order to obtain the maximum output of molded latex foam mattresses from the apparatus of the present invention, it is contemplated that there will be provided not only the gel and curing run represented by the endless conveyor just described, but also disposed at one side of such run a cooling run, not shown. It is also contemplated that adjacent the receiving end of the endless conveyor of Fig. 1 there will be provided a pouring station, not shown, where the molds are filled with latex and then moved by hand over the supporting rollers 36 or other anti-friction supporting means, to the receiving end of the endless conveyor shown in Figs. 1 and 2, to be advanced slowly by this endless apron through the gelling and curing areas. The rate at which this apron travels will depend upon the size and thickness of the mattress being cured. Large mattresses may be advanced at about one foot per minute and small ones faster. When the molds M reach the discharge end of such endless conveyor, the latex foam therein should be cured and ready to be stripped from the molds at a point beyond the right-hand end of the conveyor shown in Fig. 1. The empty molds are then moved to a position to be advanced in the opposite direction through a cooling chamber where they are subjected to streams of cooling air, so that the molds will be relatively cool by the time they reach the filling station, where they should be examined to see that any latex deposits are removed therefrom. The molds are then sprayed with a soap solution or other anti-friction material, and are now ready to be filled again with latex foam containing a vulcanizing agent and a gelling agent which will cause the foam to set quickly when subjected to heat.

After each mold M has been filled with latex foam and the cover 10 has been placed upon the mold, it is moved to the receiving end of the upper run of the endless conveyor shown in Figs. 1 and 2 to be advanced by such upper run through a heating chamber C which is conveniently heated by electric coils (not shown), so that as the molds advance through this chamber the heat will cause the latex foam therein to gel by the time the mold passes out of this gelling station to the curing portion of the endless conveyor. This curing portion constitutes the major portion of the upper run of the endless conveyor.

As above stated, the present invention contemplates the curing of the latex foam quickly by forcing dry steam into the mold at various points to pass through the cellular foam structure and cure or vulcanize the foam. The invention, however, relates more particularly to means for supplying clean, dry super-heated steam to several adjacent molds throughout the major portion of their travel along the upper run of the endless conveyor. This is accomplished by supplying steam continuously to such molds from a source of steam supply disposed above such upper run. This source of steam may be a relatively large steam pipe 45 having extending at right angles thereto the branch pipes 46 and 47. Leading downwardly from the branch pipe 46 is a relatively long flexible hose 48, and leading downwardly from the branch pipe 47 is a similar hose 49. The arrangement is such that one flexible hose 48 or 49 can be shifted by a workman rearwardly from an advance point along the endless conveyor to a rear point while the other hose is supplying steam to several connected molds M. This is illustrated in Fig. 1 of the drawings wherein the hose 48 is shown in full lines as having been disconnected from a nipple 28 of the control valve 24 of a mold, and is being moved rearwardly by hand in the direction indicated by the arrow to occupy the dot-and-dash line position where it is connected to a rearward valve 24. While the flexible hose 48 is being moved from an advance to a rearward position, as just described, the flexible hose 49 will supply steam to a group of the molds M which are connected by the longitudinally extending flexible pipes 30, one of which is shown in Fig. 3. The hose 48 is provided near its lower end with a shutoff valve 50 and the hose 49 with a similar valve 51.

Each of these pipes 30 is supported in a horizontal position and is protected by the above mentioned guard 31, and one end of such pipe is connected to the four-way valve 24 while the other end is supplied with a threaded coupling 32 adapted to be connected to the threaded nipple 29 of another mold. In Fig. 1 of the drawings, all of the molds M to the right of the gelling chamber C are shown as connected one to the other by the longitudinally extending flexible pipes 30, so that as steam is supplied by the flexible hose 49 to the four-way valve 24 to which it is connected, some of the steam will enter the adjacent mold M and the rest of such steam will pass either rearwardly or forwardly through the flexible pipes 30 to the other connected molds being advanced by the endless conveyor. The speed of the conveyor should be such that by the time a mold reaches the discharge end of the conveyor the latex foam therein will be cured or vulcanized, whereupon the mold may be opened and the cured latex article removed therefrom.

In order to cure rapidly the mass of latex foam in large advancing molds a relatively large supply of steam is needed; therefore, the downwardly extending flexible pipes 48 and 49 should be several inches in diameter, and all other pipe connections should be large enough to accommodate a substantial flow of clean, dry super-heated steam. Since the workman whose duty it is to operate the four-way valves 24 and to connect up and disconnect the couplings provided to supply steam to the molds, works with super-heated steam, care must be exercised to prevent him from being scalded with this super-heated steam. The preferred manner in which the valves are operated and the couplings are manipulated is illustrated in Fig. 7 which will now be described.

Near the top of the sheet in Fig. 7 of the drawings is shown a single mold M which is also designated by the numeral I. This, it may be assumed, is the first mold to pass out from under the heated gelling chamber C when a run is started up in the morning. Before this mold reaches the position in which it is shown in the uppermost row of Fig. 7 the flexible pipe 30 should have its outer end closed by a cap 52. In this view the rotating valve 27 is shown as turned to a position to place in communication the pipes 23, 30 and 28 and to close off pipe 29, so that if a flexible hose such as 48 is connected by its quick coupling 28' (Fig. 5) to nipple 28, and the valve 50 for the hose 48 is turned to its open position as shown in the upper row of Fig. 7, steam will pass from the flexible hose 48 into the mold I to force air out of the gelled cellular mass in the mold and replace such air with dry steam. This displaced air can escape from the mold through the vents 53 shown in Fig. 4. Steam is supplied to the various steam discharge cores 16 through the pipe connections shown in Fig. 3. While the latex within this mold I is being heated by the steam supplied by the pipe 48, the mold is being advanced in a right-hand direction by the endless conveyor of Fig. 1, and in a short time this mold will have arrived at the position in which it is shown in the second row of Fig. 7. In this second row, it will be noted that the valve 50 of the flexible hose 48 has been turned to its off-position and that the nipple 29 of the mold I is now connected to the flexible pipe 30 of the next adjacent mold II, also that the four-way valve of this mold I has been turned to close off the nipple 28 and to connect the three remaining parts of this valve. It will also be noted that in the second row of Fig. 7 the flexible hose 49 is now connected to the valve of the mold II, and that the valve 27 of this mold is positioned as shown so that the steam supplied by the hose 49 will pass into the mold II and also through the connections 30 and 29 into the mold I. With the parts in this position the valve 50 of the hose 48 may be closed and this hose disconnected from the position in which it is shown, so that it can be moved rearwardly to be secured to a rearwardly advancing mold, as shown in the third row of Fig. 7. In this third row it will be noted that the nipple 28 of the mold I is now provided with a cap 54, and that the hose which was connected to this nipple 28 has been moved rearwardly and is now connected to the mold III, and that its valve 50 is now turned to the open position so that at this instance steam is being supplied from this pipe 48 to the molds III, II, and I, while the valve 51 of the hose 49 is turned to the off-position.

Now referring to the fourth row of Fig. 7, it will be noted that molds I, II, III and IV are connected by the flexible pipes 30 and that the four-way valves are so positioned that steam is at this instant being supplied to all four molds from the flexible hose 49 connected to the mold IV. It will also be noted in this row that the mold I' shown in dot and dash lines has been disconnected from the pipe 30 which has been provided with a cap 52. The mold I which at this time will be approximately at the delivery end of the endless conveyor of Fig. 1 should have the latex foam therein cured so that this mold may now be opened and the cured article removed therefrom. This mold may then be returned through the cooling chamber, above-mentioned, and prepared for refilling with latex foam. If the four-way valve 24 for each mold M is operated as above described and as illustrated in Fig. 7, these molds will be supplied with steam for a substantial period as they are advanced along the curing run by the endless conveyor. If a number of molds are connected by the horizontally extending flexible pipes 30, then the downwardly extending flexible hose 48 or 49 need not travel for a distance of more than about two molds before it is shifted from a forward position to a rearward position, as above described, and since the molds travel at a speed of about one foot per minute for large molds, the workman attending the machine should be able to operate the valves as above described and shift a hose 48 or 49 from a forward to a rearward position during the normal travel of the endless conveyor. If he should fail to disconnect an advanced flexible hose 48 or 49 before a substantial pull is exerted thereupon by the advancing mold to which it is connected, this pull will serve to tilt the branch pipes 46, 47 and operate a microswitch 55 to stop the travel of the endless conveyor upon which the molds rest.

When steam is first introduced into a mold, as is done when each mold reaches the position shown in the left-hand vertical column of Fig. 7, such steam will force air out of the cells in the latex foam within the mold and this air can escape through the vents 53. While the steam supplied by the flexible pipes 48, 49 should be super-heated and under substantial pressure, the pressure should be such that by the time it reaches the discharge end of the cores 16 and escapes from beneath the pop valves 17 it should have a pressure of not more than about two pounds, so that it will not blow away or crush the gelled latex foam surrounding such pop valve. The amount of steam required to heat a mold and foam therein will be large until the confined air is replaced by steam, the steam requirement will be less after the parts are heated. If at any time water of condensation accumulates in the pipes below a mold, it may be drained off by opening the drain cock 21 shown in Fig. 3. The molds are shown in Fig. 1 as disposed close to each other with the bumpers 35 engaging the next mold, and the pipe guard 31 serves to protect the valve 24 and associated parts as the mold is being shifted at either end of the endless conveyor.

It will be seen from the foregoing that by employing the construction best shown in Fig. 1 of the drawings, the operation of producing molded latex foam can be carried on continuously, and that as the molds are advanced by the endless conveyor steam is supplied uninterruptedly to a group of molds by one or the other of the flexible pipes 48, 49. As a mold approaches the end of the reach of such flexible pipe, it is shifted manually to a rearward position while steam is being supplied to the group of molds by the other flexible pipe and by the horizontally extending flexible pipes 30 which connect a group of such molds. The use of steam to travel through all portions of the cellular structure of the foam in a mold so as to heat the entire cellular structure almost instantly, produces a much quicker cure than can be secured when the mold is moved into a vulcanizing oven where the heat will slowly penetrate into the interior of the latex foam mass. It will therefore be seen that the present invention serves to cure large molded articles of latex foam quickly and in a highly satisfactory manner.

Having thus described my invention, what I claim and desire to protect by Letters Patent is:

1. The method of curing latex foam simultaneously in a series of advancing molds constructed for the passage of steam through the foam mass in the molds to cure the foam; which comprises advancing a series of molds filled with latex foam along a predetermined path, providing a readily detached steam connection between these molds to travel with them, and providing a hose leading from a fixed source of steam supply to said steam connection and adapted to be readily shifted from a forward connected point to a rearward connected point along such connection as the molds advance, to thereby supply steam simultaneously to several of the advancing molds.

2. The method of curing latex foam simultaneously in a series of advancing molds constructed for the passage of steam through the foam mass in the molds to cure the foam; which comprises advancing a series of molds filled with latex foam along a predetermined path, providing a readily detached steam connection between these molds to travel with them, and providing two similar flexible tubes leading from a fixed source of steam supply to be readily connected at different points along said connection, whereby while one of these tubes is supplying steam to said advancing connection the other tube can be shifted from a forward to a rearward point to be secured to said connection.

3. The method of heating a series of filled advancing molds, which comprises advancing such molds along a predetermined path, providing steam connections between these molds to travel with them and which have readily disconnected coupling joints along such connections, providing a hose leading from a fixed source of steam supply and which is adapted to be connected to a coupling joint to travel therewith and to be shifted rearwardly from time to time to a rear coupling joint, to thereby supply heating steam to the advancing molds.

4. The method of heating a series of filled advancing molds, which comprises advancing such molds along a predetermined path, providing steam connections between these molds to travel with them and which have readily disconnected coupling joints along such connections, supplying two hose lengths leading from a fixed source of steam supply and adapted to be connected alternately to coupling joints to travel therewith and to be shifted from a forward to a rearward coupling joint of the advancing steam connections, to thereby supply heating steam to the molds.

5. The method of heating a series of filled advancing molds; which comprises advancing such molds past a steam supply point, providing steam connections between these advancing molds to travel therewith and having hose coupling joints along said steam connections, and supplying a hose leading from said supply point and adapted to be connected to a coupling joint to travel therewith and then shifted rearward to another coupling joint, to thereby supply steam to the advancing molds.

6. The method of heating a series of filled advancing molds; which comprises advancing such molds along a predetermined path, providing steam connections between several of these molds and from time to time disconnecting the leading mold and connecting a trailing mold to the group, providing a hose leading from a fixed source of steam supply and coupling it to said steam connections, and shifting the point at which the hose is attached to such connections rearwardly from time to time as the group of molds advance, to thereby heat the molds.

7. The method of heating a series of filled advancing molds; which comprises advancing such molds along a predetermined path, providing steam connections between several of these molds and from time to time disconnecting the leading mold and connecting a trailing mold to the group, providing two hose lengths leading from a fixed source of steam supply and coupling each to said steam connection at successive points one rearward of the other to maintain a supply of steam to the series of advancing molds.

8. Apparatus for supplying steam simultaneously to the interior of a series of advancing molds, comprising a number of molds each having a steam pipe leading to the interior thereof, a conveyor for advancing several of these molds in a series along a predetermined path, steam connecting means connecting the steam pipes of several of such molds, and a hose leading from a fixed source of steam supply to one of said steam pipes and adapted to be shifted rearwardly from one such steam pipe to another as the molds advance, to thereby heat a group of the advancing molds.

9. Apparatus for supplying steam simultaneously to the interior of a series of advancing molds, comprising a number of molds each having a steam pipe leading to the interior thereof, a conveyor for advancing several of these molds in a series along a predetermined path, steam connecting means connecting the steam pipes of several of such molds, and two hose lengths leading from a fixed source of steam supply and adapted to be connected to said steam pipes one to the rear of the other and to be shifted rearwardly as the molds advance, to thereby supply steam to a group of such advancing molds.

10. Apparatus for supplying steam simultaneously to the interior of a series of advancing molds filled with latex foam, comprising a number of such molds each having a steam pipe leading into the interior thereof, means for advancing several of these molds in a series along a predetermined path, means for connecting said pipes of the series one to the other, a pair of flexible tubes leading from a fixed source of steam supply and each having means for connecting it to any one of said steam pipes, whereby one of such tubes can be shifted from a forward to a rearward connected point while steam is supplied to the connected molds by the other tube.

11. Apparatus for supplying steam simultaneously to the interior of a series of advancing molds filled with latex foam, comprising a number of such molds each having a steam pipe leading into the interior thereof and a four-way valve connected to such pipe, means for advancing several of these molds along a predetermined path, readily detachable hose connections between said valves, a pair of flexible tubes leading from a fixed source of steam supply and each having a coupling for attaching it to any one of said valves so that a tube can be shifted from a forward to a rearward valve as the molds advance, and said four-way valve being operable to receive steam from either a forward or rearward connection.

12. Apparatus for supplying steam simultaneously to the interior of a series of advancing molds filled with latex foam, comprising a number of such molds each having a steam pipe leading into the interior thereof and a four-way valve connected to such pipe, means for advancing several of these molds along a predetermined path, readily detachable hose connections between said valves, a pair of flexible tubes leading from a fixed source of steam supply and each having a coupling for attaching it to any one of said valves so that a tube can be shifted from a forward to a rearward valve as the molds advance, and said four-way valve being operable to supply steam to its mold direct from one of said flexible tubes and also from either a forward or rear connection.

13. Apparatus for supplying steam simultaneously to the interior of a series of advancing molds filled with latex foam, comprising a number of such molds each having a steam pipe leading into the interior thereof, a flexible hose connected to each such pipe and adapted to be removably attached to the pipe of an adjacent mold, means for advancing several of these molds along a predetermined path, and means for supplying steam to the several connected molds comprising a pair of flexible tubes leading from a source of steam supply and adapted to be removably connected to any one of said pipes, whereby the advanced tube can be shifted to a rearward position while the other tube supplies steam to the connected molds.

LEWIS W. LUBENOW.

No references cited.